INVENTOR.
ROBERT M. RUBIN
BY George L. Church
ATTORNEY

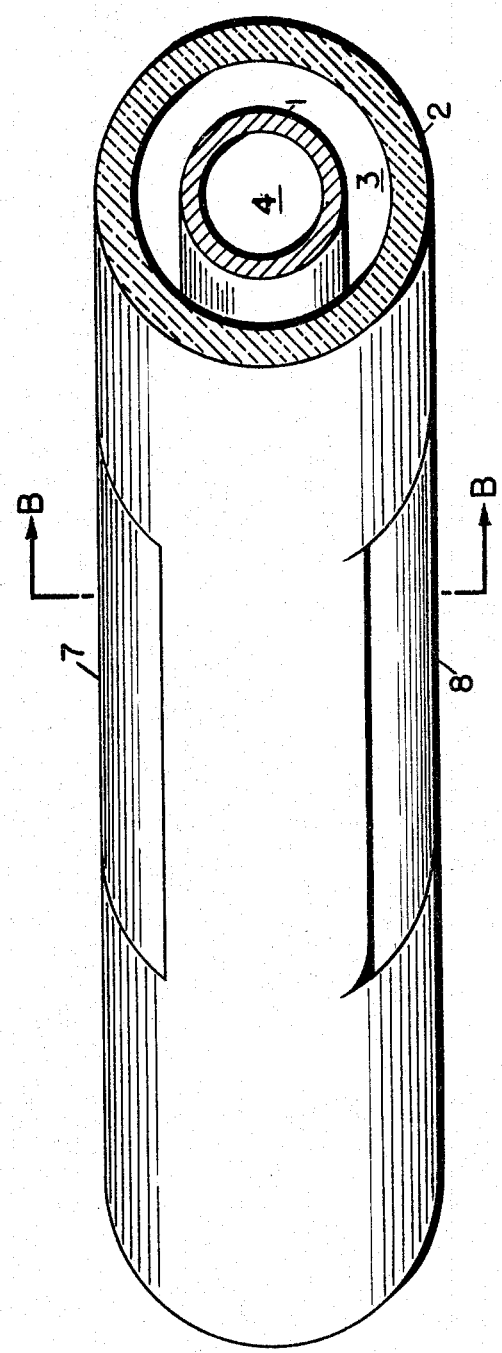

Aug. 2, 1966 R. M. RUBIN 3,263,742
TEMPERATURE CONTROLLER FOR FLUIDS
Filed June 3, 1964 5 Sheets-Sheet 4

INVENTOR.
ROBERT M. RUBIN
BY George L. Church
ATTORNEY

United States Patent Office 3,263,742
Patented August 2, 1966

3,263,742
TEMPERATURE CONTROLLER FOR FLUIDS
Robert M. Rubin, Havertown, Pa., assignor to Sun Oil Company, Philadelphia, Pa., a corporation of New Jersey
Filed June 3, 1964, Ser. No. 372,188
7 Claims. (Cl. 165—39)

This invention relates to a temperature controller, and more particularly to a temperature controller which operates automatically to maintain substantially constant the temperature of a fluid traveling through a pipe.

The controlling of the temperature of a process, or portion of a process, is highly important in many industrial applications. There are many methods which may be used for controlling temperature. In general, however, a signal describing the temperature of the system to be controlled is used to control a temperature regulator, the actual temperature regulation being done by means of a heat exchanger operated by a controller. The signal which describes the temperature of the system may be, for example, obtained by the use of thermocouple, gas, resistance, pneumatic, or pyrometric principles, or any combination of these. Controllers may be of several types, e.g., electrical, mechanical, or pneumatic, or combinations of these.

All of the foregoing methods and components, however, lack the simplicity which is desired for certain application. Moreover, most of them require the transmission of power to the installation.

An object of this invention is to provide a novel and rather simple type of temperature controlling apparatus for fluids.

Another object is to provide a temperature controlling apparatus which is self-contained and which requires no power for operation.

Still another object is to provide a temperature controlling apparatus which has a low initial cost and also a low maintenance cost.

A further object is to provide a novel temperature controller for fluids which operates automatically, and which effects proportional control.

The objects of this invention are accomplished, briefly, in the following manner: A body of heat-insulating material, in the form of a hollow cylinder, surrounds but is spaced from a heat-conducting (metallic) pipe through which is traveling the fluid whose temperature is to be controlled. Portions of this body are cut free from the remainder of the body, to form panels, and these panels are arranged for movement with respect to the remainder of the body, thereby to directly (and variably) couple the air space between the body and the pipe to the ambient. These panels are arranged for mechanical movement by means which is responsive to the temperature of the fluid.

A detailed description of the invention follows, taken in conjunction with the accompanying drawings, wherein:

FIG. 3 is an isometric view, partly in section, of a temperature controller arrangement according to this invention;

Figure 2:
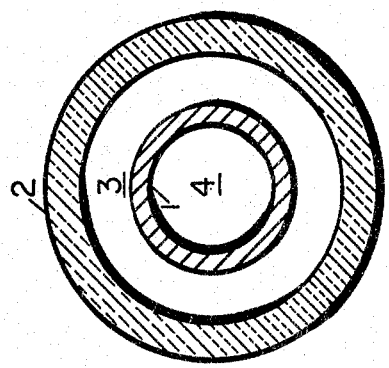
FIG. 2 is a section taken on line A—A of FIG. 1.
Figure 1:
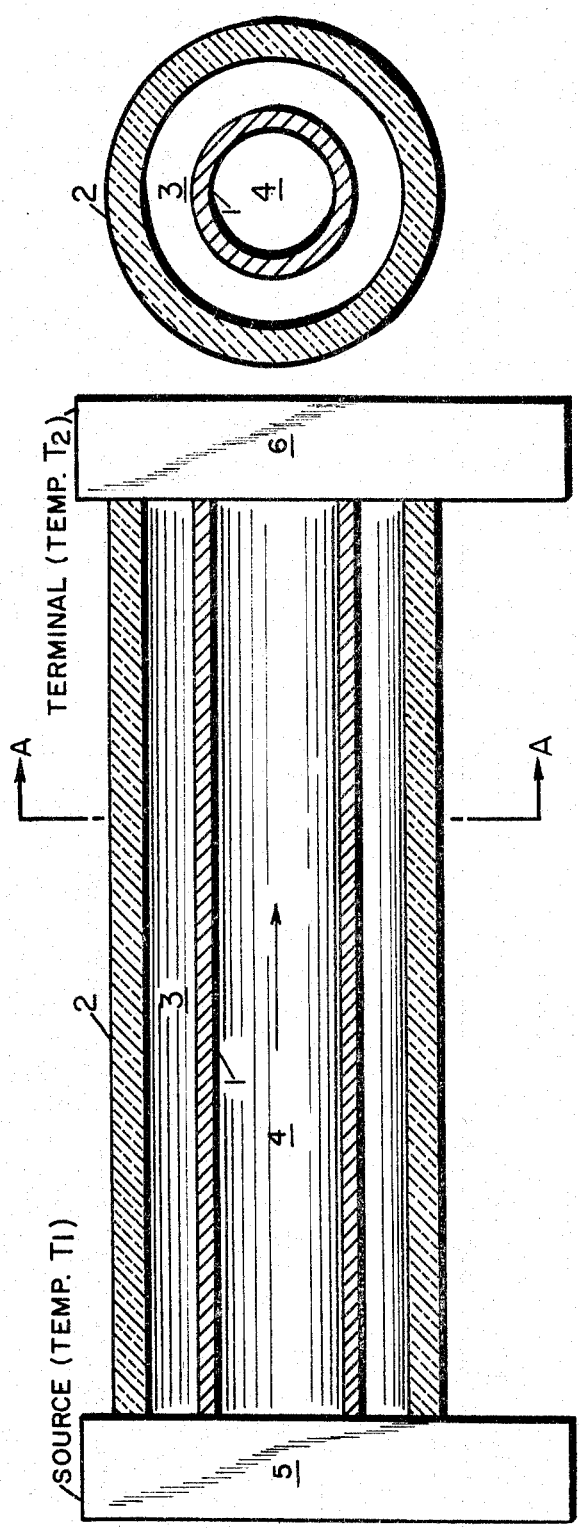
FIG. 1 is a longitudinal section through a fluid transfer pipe.

Refer first to FIGS. 1 and 2. Fluid 4 is traveling in the direction of the arrow in FIG. 1 through a fluid transfer line (heat-conducting or metallic pipe) 1 from a source point 5, whose temperature is $T_1$, to a terminal point 6, whose temperature is $T_2$. A body 2 of heat insulating material surrounds but is spaced from pipe 1, to leave a dead air space 3 between the body 2 and pipe 1; as shown, body 2 has the form of a hollow cylinder which is coaxial with pipe 1. The ambient surrounds body 2, the ambient temperature being represented by $T_4$.

Because of the insulation 2 which surrounds the dead air space 3, the heat loss of the fluid, during its travel between source 5 and terminal 6, is small.

Figure 4:
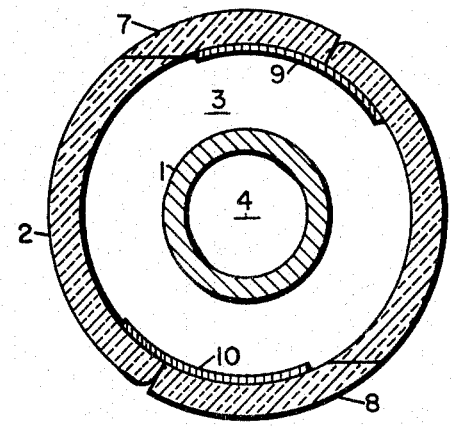
FIG. 4 is a section taken on line B—B of FIG. 3.
Figure 5:
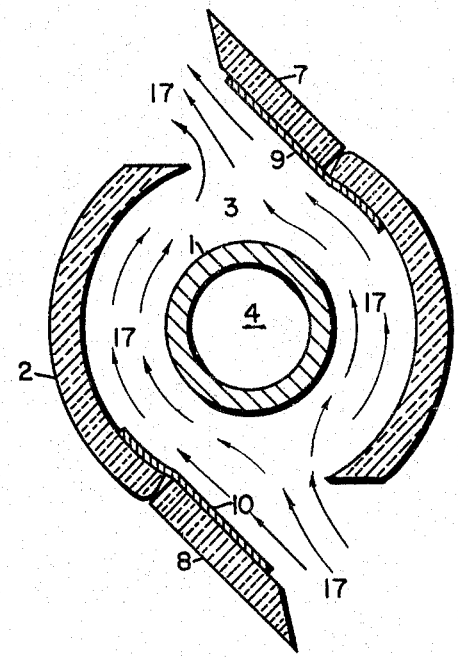
FIG. 5 is a view similar to FIG. 4, but showing the panels in an open position.

Refer now to FIGS. 3–5. According to this invention, portions of the cylindrical wall of body 2, located at respective diametrically-opposite sides of the pipe 2, are cut free from the remainder of the body, to form upper and lower panels 7 and 8, respectively. By way of example, these panels 7 and 8 may be located more or less centrally of the length of body 2. The portion of the body 2 which includes panels 7 and 8 may be termed the control section. As shown in FIG. 4, panels 7 and 8 are arranged for movement with respect to the remainder of body 2. More specifically, the upper panel 7 is hingedly mounted at the upper part of the control section by means of a bimetallic strip 9 secured at one end to the inner surface of panel 7 and secured at its other end to the inner surface of body 2. Panel 7 is thus movable (under the control of strip 9) with respect to the remainder of body 2, from the "closed" position illustrated in FIG. 4 clockwise about the hinge to the "open" position illustrated in FIG. 5, wherein the air space 3 is in direct and intimate communication with the ambient surrounding body 2; the air space 3 is variably coupled to the ambient under the control of strip 9.

The lower panel 8 is hingedly mounted at the lower part of the control section diametrically opposite to panel 7, by means of a bimetallic strip 10 secured at one end to the inner surface of panel 8 and secured at its other end to the inner surface of body 2. Panel 8 is thus movable (under the control of strip 10) with respect to the remainder of body 2, from the "closed" position illustrated in FIG. 4 clockwise about its hinge to an "open" position wherein the air space 3 is in direct and intimate communication with the ambient surrounding body 2; the air space 3 is also variably coupled to the ambient under the control of strip 10. The panels 7 and 8 may comprise a flexible insulating material, if necessary, to allow for expansion and contraction of these panels as they swing back and forth.

The bimetallic strips 9 and 10 are in intimate thermal contact with the air space 3, and are thus responsive (albeit somewhat indirectly) to the temperature of the fluid 4 within pipe 1, as it is presented at the outer surface of this heat-conducting pipe.

The mode of operation of the invention will now be explained, with reference to FIG. 5. It is desired to operate the fluid transfer arrangement so that the fluid is maintained at a substantially constant desired temperature. The desired temperature $T_5$ of the air space 3 at the control section is calculated by determining the heat loss, if any, through the insulation 2. This temperature will be approximately the temperature $T_3$ of the fluid 4. When the temperature of the air space 3 at the control section shifts so that it is between $T_1$ (the source 5 temperature) and $T_5$ (that is, when $T_3$ rises above $T_5$), the bimetallic strips 9 and 10 will cause the control panels 7 and 8 to open, as illustrated in FIG. 5. The closer the temperature of the air space 3 at the control section is to $T_1$, the farther these panels will open. Thus, the air space 3 at the control section is directly (when the panels open) and variably coupled to the (cooler) ambient surrounding body 2. The panels 7 and 8 will gradually close as the temperature $T_3$ of the air space at the control section approaches $T_5$.

When panels 7 and 8 open, there will be an air current 17 through the air space 3, as shown in FIG. 5, caused by the placement of the panels one above (to wit, panel 7) and one below (to wit, panel 8) the pipe 1. This effect results from the difference in density (due to the difference in temperature) of the air in air space 3 and the ambient outside the insulation (body 2). The temperature $T_3$ of the fluid 4 will therefore tend to shift toward the (lower) ambient temperature $T_4$. The rate of response of the temperature controller is a function of the area of the movable panels. In order to aid in the emission or absorption of radiation, the pipe 1 could be colored black, for the length of the control section.

The only restrictions on the system are that $T_1 > T_5 > T_4$ or $T_1 < T_5 < T_4$. That is to say, the desired temperature $T_5$ must lie between the ambient temperature and the source temperature.

It may be noted that, in FIG. 5, the panels 7 and 8 (illustrated in the "open" position) are shown with planar faces, rather than arcuate faces as in FIG. 4. This results from the facts that strips 9 and 10 tend to straighten out when they become heated, and panels 7 and 8 preferably comprise flexible material, allowing them to straighten out correspondingly.

Figure 6:
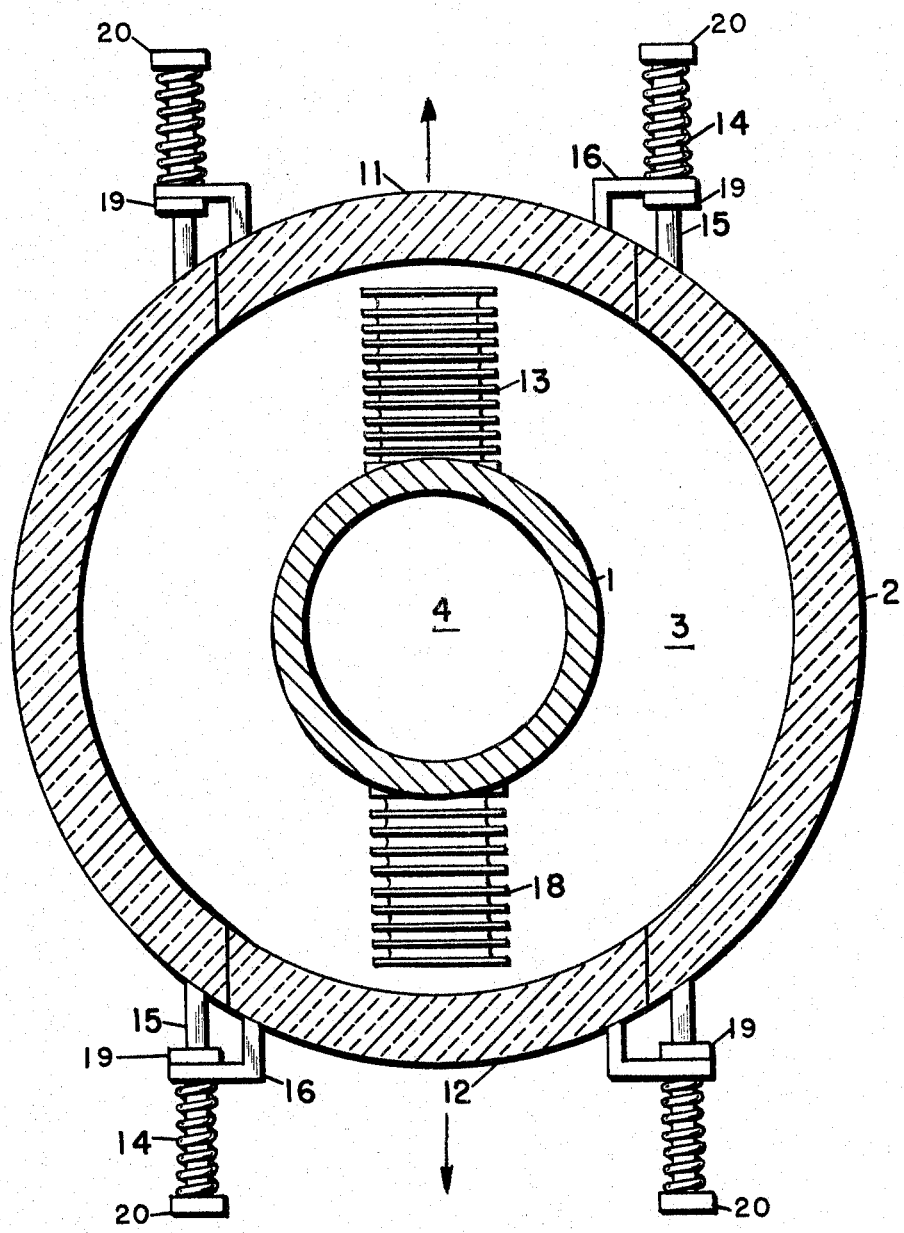
FIG. 6 is a view similar to FIG. 4, but showing a modified construction.

FIG. 6 illustrates a modified form of construction for the control section of the insulating body, for use when the temperature $T_3$ of the fluid 4 (and also the control temperature $T_5$) is higher than the ambient temperature $T_4$. Panels 11 and 12 are provided to form a control section, as in FIGS. 3–5, but in the case of FIG. 6 the diametrically-opposite panels 11 and 12 are cut in such a way as to adapt them for movement radially with respect to body 2 and with respect to pipe 1. In FIG. 6, the panels 11 and 12 are illustrated in the closed position; they move radially outwardly when they open, as indicated by the arrows adjacent the panels in this figure.

A gas-filled bellows 13 has one end attached to the pipe 1; when this bellows expands due to an increase in the fluid temperature $T_3$ above the control point temperature $T_5$ (this increase in the fluid being communicated directly to this bellows by the heat-conducting pipe 1) its outer end engages the inner face of panel 11 and pushes this panel radially outwardly to open it. A second gas-filled bellows 18 has one end attached to pipe 1, and when it expands it pushes panel 12 radially outwardly, to open this latter panel. When the panels 11 and 12 are open, an air current is established through air space 3, as previously explained in connection with FIG. 5. This causes the cooler ambient to bring the fluid temperature $T_3$ down toward the control temperature $T_5$. It will be noted that both of the bellows 13 and 18 are responsive to the temperature of the fluid in pipe 1.

A plurality of guiding and biasing assemblies, located along the edges of the panels 11 and 12, are used to yieldingly oppose the radially-outward movement of the panels 11 and 12, upon radially-outward (i.e., longitudinal) expansion of the bellows 13 and 18. Also, the said assemblies guide radial movement of the panels, when they move radially outwardly from the closed position illustrated in FIG. 6. Each guiding and biasing assembly includes: a guide arm 16 one end of which is secured to the outer surface of the corresponding panel and the opposite end of which can slide freely (in the outward direction) along a guide post 15; a guide post 15 secured at one end to the outer surface of fixed body 2 and extending outwardly therefrom; and a compression spring 14 surrounding post 15, one end of this spring engaging the post end of arm 16 and the other end thereof engaging a fixed abutment 20 at the outer end of post 15. The spring 14 yieldingly opposes the outward movement of the panels 11 and 12, as transmitted thereto by the receptive arms 16, and the arms 16, sliding on the respective posts 15, guide the movement of the panels outwardly with respect to the position illustrated in FIG. 6.

The FIG. 6 construction is intended to be used for the case where the control temperature $T_5$ is higher than the ambient temperature $T_4$. If for some reason the fluid temperature $T_3$ drops below the control point temperature $T_5$, control could be lost if the panels 11 and 12 were to open inwardly (which would reduce the temperature $T_3$ still further, since it is above ambient temperature $T_4$); the panels might open inwardly under these conditions since bellows 13 and 18 would then contract. To prevent this from happening, a stop 19 is rigidly attached to each of the posts 15, in a position such as to just engage the inner side of each respective arm 16 when the panels 11 and 12 are closed. The stops 19, rigidly attached to the guide posts, engage the respective arms 16 and positively prevent movement of the panels 11 and 12 inwardly from the position illustrated in FIG. 6.

As previously described, the FIG. 6 construction is intended to be used under conditions wherein the temperature $T_3$ of the fluid (and also the control point temperature $T_5$) is higher than the ambient temperature $T_4$. By making slight modifications in the FIG. 6 construction, the same basic arrangement can be used to control at a temperature $T_5$ which is below the ambient temperature $T_4$. Here, the second "restriction" previously given is applicable; this states that the source temperature $T_1$ is less than the control temperature $T_5$, which in turn is less than the ambient temperature $T_4$. For this modification, the bellows 13 and 18 are increased in length, so that the outer ends thereof contact the inner faces of the respective panels 11 and 12, and the springs 14 are modified (by proper positioning of the abutments 20, for example) so that when the panels are closed, adjacent turns of the springs are in contact with each other, or nearly so. Another way of stating the latter is that when the panels are closed, the springs 14 are completely (or nearly completely) compressed, so that they serve in effect as stop members to prevent outward movement of the panels. Thus, in this modified construction, the panels 11 and 12 cannot move outward; they can move only inward. Now, when the fluid in line 1 cools too much (i.e., when the fluid temperature $T_3$ becomes less than the control temperature $T_5$), bellows 13 and 18 will contract, and the driving force of the springs 14 (these springs being under compression, and acting against the fixed abutments 20) will force the panels 11 and 12 inwardly. This allows the warmer ambient air to raise the temperature $T_3$ of the fluid back to the control temperature $T_5$. When this occurs, the panels 11 and 12 will move back outwardly (to the closed position), because of the expansion of the bellows 13 and 18.

Figure 7:
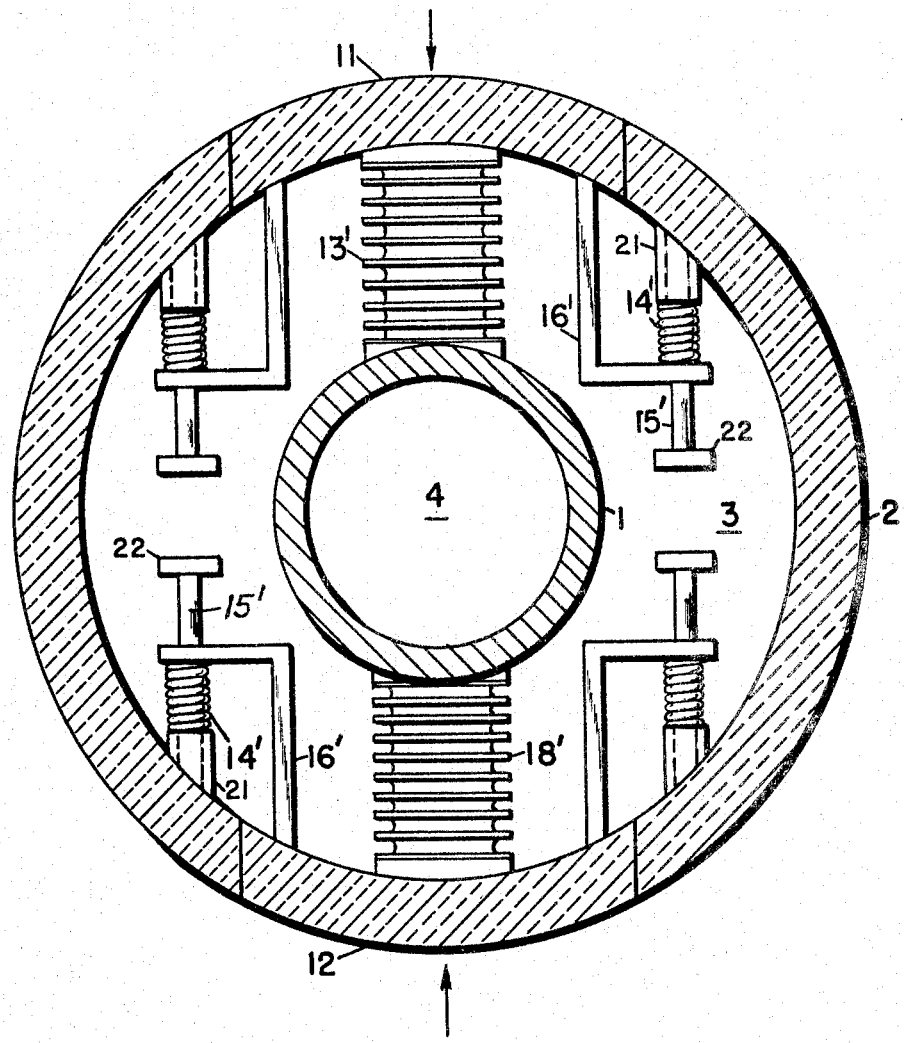
FIG. 7 is a view similar to FIG. 4 of a further modification.

FIG. 7 illustrates another modified form of construction for the control section of the insulating body. This construction is intended for use when the temperature $T_3$ of the fluid 4 (and also the control temperature $T_5$) is lower than the ambient temperature $T_4$. Panels 11 and 12 are adapted for movement radially with respect to body 2 and pipe 1, as in FIG. 6; however, in FIG. 7 the panels (illustrated in the closed position) move radially inwardly when they open, as indicated by the arrows in this latter figure.

A gas-filled bellows 13' has one end attached to the pipe 1; when this bellows contracts due to a decrease in the fluid temperature $T_3$ below the control point temperature $T_5$ (this decrease in the fluid temperature being communicated directly to this bellows by the thermally-conducting pipe 1), the panel 11 (which is held against the outer end of this bellows by a means to be described subsequently) is allowed to move inwardly, to open such panel. A second gas-filled bellows 18' has one end attached to pipe 1; when this bellows contracts, panel 12 (which is held against the outer end of such bellows by a means hereinafter described) is allowed to move inwardly, to open this latter panel. When the panels 11 and 12 are open, an air currect is established through air space 3, rather similar to that explained in connection with FIG. 5. In the case of FIG. 7, the warmer ambient brings the fluid temperature $T_3$ up toward the control temperature $T_5$. It will be noted that both of the bellows 13' and 18' are responsive to the temperature of the fluid in pipe 1.

A plurality of guiding and biasing assemblies located along the edges of the panels 11 and 12, are used to maintain the inner faces of the panels 11 and 12 in engagement with the outer ends of bellows 13' and 18', respectively, and to guide radial movements of the panels when they move inwardly from the closed position illustrated in FIG. 7. Each guiding and biasing assembly includes: a guide arm 16' one end of which is attached to the inner surface of the corresponding panel and the opposite end of which can slide freely (in the inward direction) along a guide post 15'; a guide post 15' secured at one end to the inner surface of body 2 and extending inwardly therefrom; and a spring 14' under compression and pushing between the post end of arm 16' and the inner end of a fixed stop or abutment 21 surrounding post 15' and secured at its outer end to the inner surface of body 2. A fixed abutment 22 at the inner end of each post 15' engages the corresponding arm 16' to limit the amount of radially-inward movement of panels 11 and 12.

In FIG. 7, when the fluid temperature $T_3$ drops below the control temperature $T_5$, the bellows 13' and 18' will contract, and the springs 14' will force the panels 11 and 12 to move inwardly, causing a flow of warmer ambient air (at temperature $T_4$, which is higher than $T_5$) to raise the temperature $T_3$ back to the control point $T_5$.

In FIG. 7, the use of stops 20 prevents outward movement of the pannels 11 and 12; thus, the panels are prevented from moving outwardly if the fluid temperature $T_3$ exceeds the control temperature $T_5$. If these stops were not present, the panels would open outwardly under these conditions due to expansion of the bellows 13' and 18', causing the (warmer) ambient temperature $T_4$ to raise the fluid temperature $T_3$ even higher, so that control could be lost. When the panels are closed, adjacent turns of the springs 14' are held in contact with each other between stop 21 and arm 16', as illustrated in FIG. 7. In other words, when the panels are closed, springs 14' are fully compressed, so that they serve in effect as in extension of stops 21, to prevent outward movement of the panels.

It is possible to modify the FIG. 7 construction so that the same basic arrangement can be used for controlling a fluid at a temperature $T_5$ which is above the ambient temperature. This would be the case when the source temperature $T_1$ is higher than the control temperature $T_5$ which is, in turn, higher than the ambient temperature $T_4$. The FIG. 7 construction is modified so that the springs 14' are not under compression when the panels 11 and 12 are closed. Also, the abutments 22 are moved outwardly, along or with respect to rods 15', so that these abutments contact the inner faces of the respective arms 16' when the panels are closed.

In the case of this last-mentioned modification, the fixed abutments 22, by positively engaging the respective arms 16', prevent the panels 11 and 12 from opening inwardly when the fluid temperature $T_3$ drops below the control temperature $T_5$ (even through the bellows 13' and 18' contract under these conditions), and thus prevent the lower-temperature ambient $T_4$ from further decreasing the fluid temperature $T_3$.

When the fluid temperature $T_3$ is above the control temperature $T_5$, the bellows 13' and 18' expand to open the panels 11 and 12 outwardly (against the yielding opposition of the springs 14', just as in FIG. 6) until the (cooler) ambient temperature $T_4$ cools the fluid down to the control temperature $T_5$.

The invention claimed is:

1. A temperature controller for fluid traveling through a heat-conducting pipe, comprising a hollow cylinder of heat-insulating material coaxially surrounding said pipe but spaced therefrom to leave a dead air space between said cylinder and said pipe, a portion of the wall of said cylinder being cut free from the body of said cylinder to form a pannel which is arranged for movement with respect to the body of said cylinder to bring said air space into direct communication with the ambient; and means responsive to the temperature of said fluid for causing movement of said panel.

2. Temperature controller in accordance with claim 1, wherein said cylinder is formed with two panels, located at respective diametrically-opposite sides of said pipe.

3. Temperature controller as defined in claim 2, including means responsive to the temperature of said fluid for causing movement of both of said panels.

4. Temperature controller according to claim 1, wherein said means is in intimate thermal contact with said air space.

5. Temperature controller according to claim 1, wherein said means is in intimate thermal contact with the outer wall of said pipe.

6. Temperature controller as set forth in claim 1, wherein said panel is hingedly mounted at one side thereof to the cylinder body, and is arranged for outward pivotal movement with respect to said body.

7. Temperature controller as set forth in claim 1, wherein said panel is mounted for linear movement as a body in a direction at right angles to the common longitudinal axis of said pipe and said cylinder.

References Cited by the Examiner

UNITED STATES PATENTS

| | | | |
|---|---|---|---|
| 1,560,434 | 11/1925 | Spanogle | 236—1 |
| 1,783,472 | 12/1930 | Hinrichs | 184—104 |
| 2,216,873 | 10/1940 | Browne | 236—49 X |
| 2,434,090 | 1/1948 | Alton | 236—49 |
| 3,048,985 | 8/1962 | Long | 62—186 |

ALDEN D. STEWART, *Primary Examiner.*